US012252200B2

(12) United States Patent
Funke et al.

(10) Patent No.: US 12,252,200 B2
(45) Date of Patent: Mar. 18, 2025

(54) DETERMINING VEHICLE POSITION USING SIDESLIP VECTOR

(71) Applicant: Zoox, Inc., Foster City, CA (US)

(72) Inventors: Joseph Funke, Redwood City, CA (US); Liam Gallagher, San Francisco, CA (US); Marin Kobilarov, Baltimore, MD (US); Vincent Andreas Laurense, Foster City, CA (US); Mark Jonathon McClelland, San Francisco, CA (US); Sriram Narayanan, San Jose, CA (US); Kazuhide Okamoto, Mountain View, CA (US); Jack Riley, San Francisco, CA (US); Jeremy Schwartz, Redwood City, CA (US); Jacob Patrick Thalman, San Francisco, CA (US); Olivier Amaury Toupet, Escondido, CA (US); David Evan Zlotnik, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 252 days.

(21) Appl. No.: 17/957,756

(22) Filed: Sep. 30, 2022

(65) Prior Publication Data
US 2024/0109585 A1 Apr. 4, 2024

(51) Int. Cl.
*B62D 7/15* (2006.01)
*B62D 15/02* (2006.01)

(52) U.S. Cl.
CPC ............ *B62D 7/159* (2013.01); *B62D 15/025* (2013.01); *B62D 15/0255* (2013.01); *B62D 15/0265* (2013.01)

(58) Field of Classification Search
None
See application file for complete search history.

(56) References Cited

U.S. PATENT DOCUMENTS

| 6,853,886 B2 * | 2/2005 | Mori | .................. B60W 40/103 701/1 |
| 6,904,349 B2 * | 6/2005 | Mori | ......................... G01L 5/20 340/429 |

(Continued)

FOREIGN PATENT DOCUMENTS

| CN | 107499378 B | 5/2019 | |
| CN | 108973769 B * | 1/2020 | .............. B60L 15/00 |

(Continued)

OTHER PUBLICATIONS

U.S. Appl. No. 17/485,041, filed Sep. 24, 2021, Schwartz, et al., "Optimization Based Planning System", 49 pages.

(Continued)

*Primary Examiner* — Kevin R Steckbauer
(74) *Attorney, Agent, or Firm* — Lee & Hayes, P.C.

(57) ABSTRACT

Systems and techniques for determining a sideslip vector for a vehicle that may have a direction that is different from that of a heading vector for the vehicle. The sideslip vector in a current vehicle state and sideslip vectors in predicted vehicles states may be used to determine paths for a vehicle through an environment and trajectories for controlling the vehicle through the environment. The sideslip vector may be based on a vehicle position that is the center point of the wheelbase of the vehicle and may include lateral velocity, facilitating the control of four-wheel steered vehicle while maintaining the ability to control two-wheel steered vehicles.

20 Claims, 7 Drawing Sheets

(56) References Cited

U.S. PATENT DOCUMENTS

| | | | | |
|---|---|---|---|---|
| 8,160,780 | B2* | 4/2012 | Shin | B62D 15/025 |
| | | | | 180/204 |
| 9,043,072 | B1* | 5/2015 | Tisdale | G05D 1/027 |
| | | | | 701/28 |
| 9,527,467 | B2* | 12/2016 | Baba | B60R 21/0132 |
| 10,077,051 | B2* | 9/2018 | Reinisch | G09B 9/04 |
| 10,831,210 | B1* | 11/2020 | Kobilarov | B60W 60/0013 |
| 11,142,188 | B2 | 10/2021 | Funke et al. | |
| 11,345,400 | B2* | 5/2022 | Funke | B62D 7/159 |
| 11,414,127 | B2* | 8/2022 | Funke | B62D 6/001 |
| 11,465,619 | B2* | 10/2022 | Silva | B60W 30/0956 |
| 11,518,412 | B2* | 12/2022 | Funke | B60W 50/00 |
| 11,572,074 | B2* | 2/2023 | Dix | B60W 40/12 |
| 11,573,571 | B2* | 2/2023 | Kobilarov | B60W 60/0011 |
| 11,702,084 | B2* | 7/2023 | Arat | B60W 40/109 |
| | | | | 701/90 |
| 11,814,051 | B2* | 11/2023 | Munko | B60T 8/17552 |
| 11,834,058 | B2* | 12/2023 | Bobier-Tiu | B60W 40/08 |
| 11,845,465 | B2* | 12/2023 | Kim | B60L 3/12 |
| 11,932,308 | B1* | 3/2024 | Churukian | B62D 7/159 |
| 2002/0198655 | A1* | 12/2002 | Bevly | B60T 8/172 |
| | | | | 701/71 |
| 2003/0089542 | A1* | 5/2003 | Mori | B60W 40/103 |
| | | | | 180/197 |
| 2003/0093190 | A1* | 5/2003 | Mori | B60W 30/02 |
| | | | | 701/1 |
| 2003/0195689 | A1* | 10/2003 | Mori | G01M 17/007 |
| | | | | 701/1 |
| 2008/0249686 | A1* | 10/2008 | Mikuriya | B62D 6/002 |
| | | | | 701/42 |
| 2009/0157263 | A1* | 6/2009 | Shin | B62D 5/0481 |
| | | | | 701/43 |
| 2013/0006477 | A1* | 1/2013 | Baba | B60R 21/0132 |
| | | | | 701/45 |
| 2018/0088582 | A1* | 3/2018 | Kong | B60W 50/0097 |
| 2020/0216085 | A1* | 7/2020 | Bobier-Tiu | B60W 40/08 |
| 2021/0109539 | A1* | 4/2021 | Kobilarov | B60W 60/0011 |
| 2021/0155251 | A1* | 5/2021 | Arat | B60T 8/172 |
| 2021/0188252 | A1* | 6/2021 | Lu | B60W 40/12 |
| 2021/0213935 | A1* | 7/2021 | Lu | B60C 23/04 |
| 2021/0362730 | A1* | 11/2021 | Dix | B60W 40/12 |
| 2021/0370921 | A1* | 12/2021 | Silva | B60W 60/0027 |
| 2021/0403049 | A1* | 12/2021 | Funke | B62D 6/002 |
| 2021/0403081 | A1* | 12/2021 | Funke | B62D 6/001 |
| 2021/0403082 | A1* | 12/2021 | Funke | B62D 6/001 |
| 2022/0048511 | A1* | 2/2022 | Munko | B60W 10/20 |
| 2023/0097171 | A1 | 3/2023 | Schwartz et al. | |
| 2023/0102778 | A1* | 3/2023 | Kim | B60L 3/12 |
| | | | | 701/23 |
| 2023/0166770 | A1* | 6/2023 | Funke | B60W 60/0025 |
| | | | | 701/25 |
| 2023/0245336 | A1* | 8/2023 | Fonseca | G06T 7/20 |
| | | | | 382/100 |
| 2023/0347880 | A1* | 11/2023 | Clawson | G06V 20/58 |
| 2023/0365149 | A1* | 11/2023 | Bobier-Tiu | B60W 60/001 |
| 2023/0406287 | A1* | 12/2023 | Hajiloo | B60W 30/02 |
| 2024/0109585 | A1* | 4/2024 | Funke | B62D 15/025 |
| 2024/0174239 | A1* | 5/2024 | Narayanan | B60W 60/001 |
| 2024/0174256 | A1* | 5/2024 | Narayanan | B60W 60/001 |
| 2024/0359706 | A1* | 10/2024 | Tagesson | B62D 15/025 |

FOREIGN PATENT DOCUMENTS

| | | | | |
|---|---|---|---|---|
| CN | 114572231 | A | 6/2022 | |
| DE | 102012210714 | A1 * | 1/2013 | B60R 21/0132 |
| JP | 2018041270 | A | 3/2018 | |
| JP | 2020119060 | A * | 8/2020 | |
| JP | 6995068 | B2 * | 1/2022 | |
| KR | 20200017571 | A | 2/2020 | |
| WO | WO-2024073295 | A1 * | 4/2024 | B62D 7/159 |

OTHER PUBLICATIONS

PCT Search Report and Written mailed Jan. 16, 2024, for International Application No. PCT/US2023/074823 from PCT Summary, 11 pages.

* cited by examiner

DETERMINING VEHICLE POSITION USING SIDESLIP VECTOR

BACKGROUND

A vehicle may be equipped with a trajectory planning system that determines an operational trajectory for the vehicle used to control the vehicle as it travels within an environment. A vehicles may also be equipped with various systems that detect objects in an environment and use such detection information to control the vehicle to avoid the objects. In order to plan trajectories and safely navigate around obstacles in the environment, a trajectory planning system may use a current vehicle state and predicted vehicle states. A vehicle state may include a position, a heading, and a velocity. As vehicle steering technology advances, various parameters of a vehicle state may be increasingly difficult to determine compared to determining such parameters for a vehicle using legacy steering technology. Accurately determining a vehicle state to plan trajectories and predict future vehicle states while also allowing a vehicle to take advantage of advanced steering technologies may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
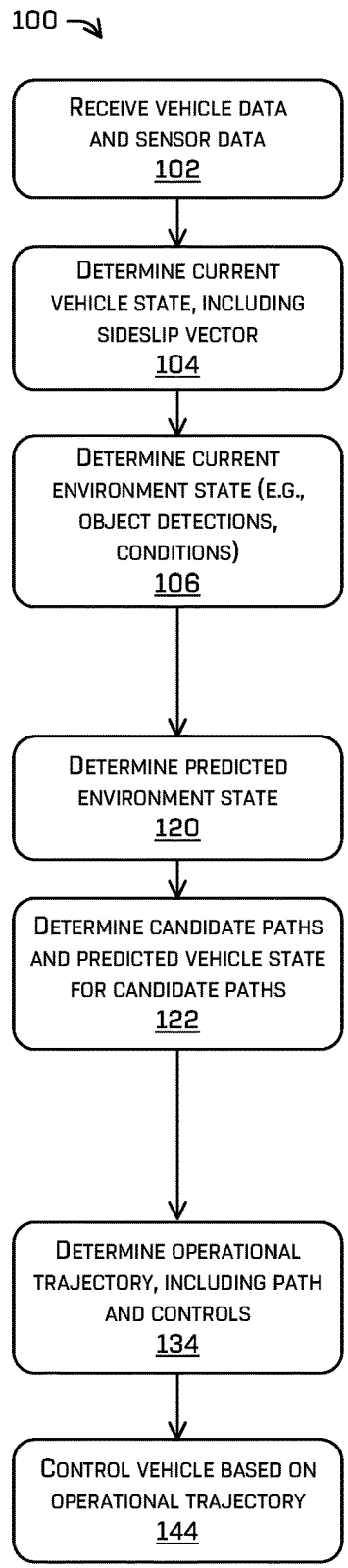
FIG. 1 illustrates an example process for determining a vehicle state using a sideslip vector and a trajectory for the vehicle based on the vehicle state, in accordance with examples of the disclosure.
Figure 1:
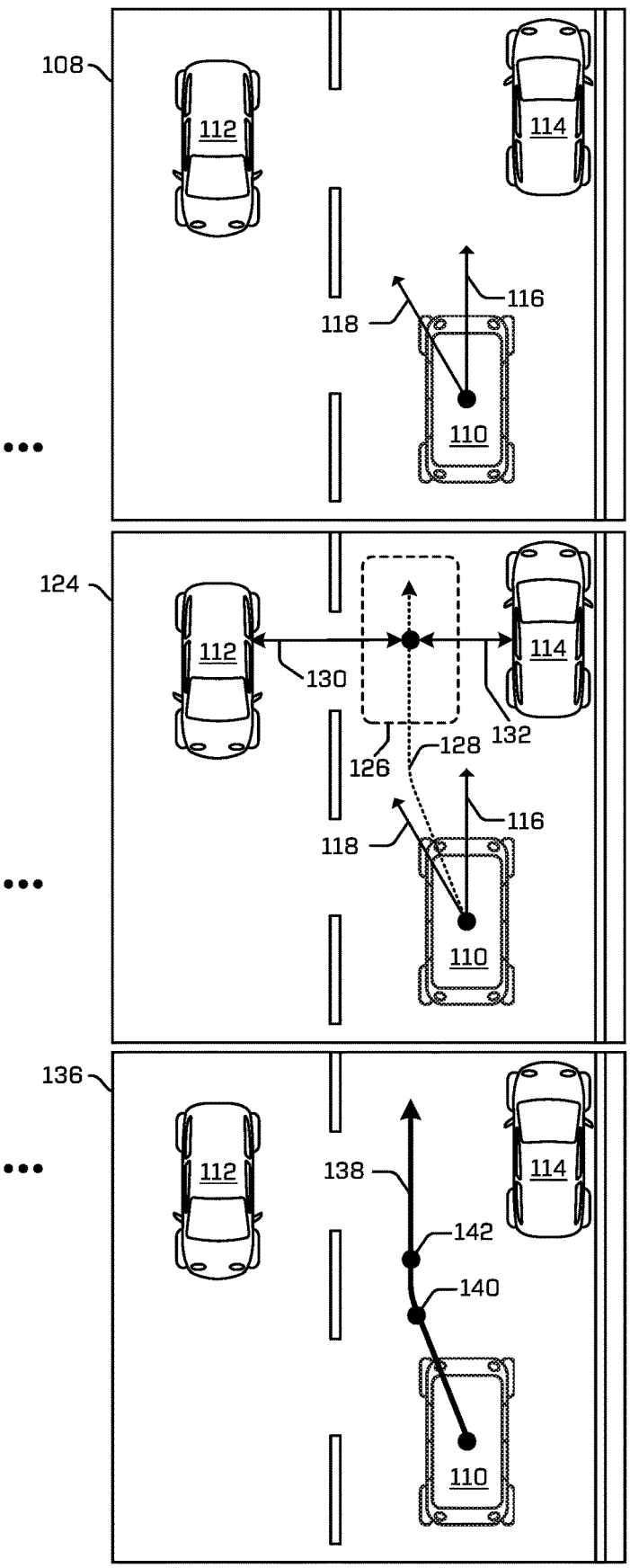

Techniques for determining a vehicle position for use in generating vehicle trajectories to control a vehicle while traversing an environment are discussed herein. For example, techniques may include determining a vehicle position based on a center point of the vehicle and a sideslip vector. A sideslip vector may represent a primary direction of motion of a vehicle and a velocity of the vehicle in that direction. The velocity represented by a sideslip vector may include lateral velocity. The sideslip vector may be determined based on the location of a center point of the vehicle. A trajectory planning system of the vehicle may use the sideslip vector, along with other vehicle state data, to determine a trajectory for the vehicle that may include a path of travel for the vehicle and various controls for controlling the vehicle at spatial and/or temporal points along the trajectory. The sideslip vector may allow for the indication of vehicle velocity in both a longitudinal direction and a lateral direction, thereby facilitating the determination and prediction of vehicle state parameters for vehicles that may be equipped with four-wheel steering, including bidirectional vehicles. The disclosed sideslip vector may also be used to indicate vehicle velocity and direction for vehicles equipped with traditional two-wheel steering. The use of the sideslip vector may also facilitate the prediction of a vehicle state for both four-wheel and two-wheel steered vehicles and the determination of controls for such vehicles. By using the disclosed sideslip vector and related operations, the systems and techniques described herein facilitate the determination of trajectories for vehicles with two-wheel steering capabilities and vehicles with four-wheel steering capabilities, and allow four-wheel steered vehicles to take advantage of their four-wheel steering capabilities.

Four-wheeled vehicles are traditionally equipped with a set of two wheels that may be rotated for use in steering the vehicle (normally at the front or leading end of the vehicle) and a set of wheels that are in a fixed position (normally at the back or trailing end of the vehicle). A spatial position of such a vehicle in an environment, from a two-dimensional top-down perspective, may be described using two-dimensional coordinates (e.g., x and y) and yaw (rotation of the vehicle about the x and y coordinates). This position is traditionally based on the center of the rear axle of the vehicle (e.g., x and y indicate the location of the center point of the rear axle and the yaw value represents the rotation of the body of the vehicle about the center point of the rear axle). The heading of the vehicle may be determined and/or commanded based on this position. For example, a vehicle at an x and y location may be heading in a direction that is perpendicular to a lateral axis of the vehicle as indicated by the yaw. In another example, a vehicle may be controlled or commended to operate in a particular heading direction from a particular an x and y location. A heading vector of such a vehicle may indicate a velocity of the vehicle in this direction. Other vehicle state parameters may be determined and/or based on this traditional spatial position information, such as acceleration, curvature, etc.

Because two-wheel steered vehicles do not have steering capabilities at the rear wheels, there is essentially no lateral velocity at the rear axle (e.g., all motion is in the longitudinal direction). Therefore, using the center point of the rear axle as a basis for vehicle position information simplifies position determinations and other operations for two-wheel steered vehicles, including determining commands or instructions that may be used to control the vehicle. For example, a heading for the vehicle may be determined based on the location the center point of the rear axle and the yaw, with a direction of a heading vector being perpendicular to a lateral axis of the vehicle and indicating the direction of motion of the vehicle. This heading may be used to implement a vehicle control and/or to determine a path for the vehicle. In such implementations, the vehicle velocity vector may simply be the heading vector at the vehicle velocity. Object proximity to the vehicle may be determined based on a perpendicular distance between the heading vector or velocity vector and the object. However, using the rear axle center point for position determination becomes much more complex if the vehicle includes rear-wheel steering capabilities because four-wheel steering capable vehicles may introduce lateral velocity of the rear axle and/or lateral velocity of the whole vehicle. Introducing lateral velocity in a vehicle may decouple the heading vector and velocity vector because the velocity vector may have a different direction than the heading vector. This lateral motion may not be accounted for in legacy techniques that use the rear axle center point for position determination and assume no lateral motion at the rear axle.

Moreover, with four-wheel steered vehicles, the heading direction (e.g., a direction perpendicular to a lateral axis, a leading axle, or a leading edge of the vehicle) may not necessarily be the direction in which the vehicle is actually moving, and therefore the velocity vector for the vehicle is also not necessarily associated with the direction that may be indicated by the heading vector. The heading direction may also differ from the direction of motion of a two-wheel steered vehicle in some circumstances, such as when the vehicle loses traction and slides in at least a partially lateral direction (e.g., "fishtailing," "drifting," sliding on an icy or wet roadway, etc.). Because legacy operation of determining vehicle controls may not allow the use or determination of a direction of motion of the vehicle that differs from the heading of the vehicle, such legacy operations may not be able to control a vehicle using the four-wheel steering capabilities that may be available. For example, such legacy operations may be capable of controlling a vehicle with controls that introduce (e.g., substantial) lateral velocity. Therefore, the use of the rear axle center point for performing position determinations, trajectory determinations, and other vehicle control operations for a four-wheel steered vehicle may be inefficient, reduce the available capabilities of the vehicle, and/or result in sub-optimal vehicle trajectories and controls.

In various examples, a sideslip vector may be used to facilitate position and trajectory determination operations for both four-wheel steered vehicles and two-wheel steered vehicles. A sideslip vector may represent the direction of travel of the vehicle, (e.g., independent of the heading direction based on the x, y, and yaw position). The velocity and/or acceleration vectors for the vehicle may use the direction of the sideslip vector. In examples, the sideslip vector represents a vehicle velocity vector that may account for lateral velocity (as opposed to a heading vector). The sideslip vector may be based on a position of the vehicle that uses the center point of the vehicle body or wheelbase (e.g., the horizontal distance between the centers of the front axle and the rear axle) rather than the center point of the rear axle. For example, in the disclosed techniques, the position of the vehicle may be the x and y coordinates of the center point of the wheelbase and the yaw of the vehicle body about that point. In various examples, the center point for sideslip vectors and used in the disclosed techniques may be any point on or associated with the vehicle, such as a center of gravity, center of mass, a geometric center of the vehicle body, a corner of the vehicle body, a center point of an edge of the vehicle, etc.

A sideslip vector may be a parameter of and/or data associated with a vehicle state. Along with a sideslip vector, a vehicle state may include a position (x, y, yaw) of a vehicle (also referred to as a "pose"), a velocity and/or velocity vector, a heading and/or heading vector (e.g., based on (x, y, yaw) and including a direction), an acceleration and/or acceleration vector, a heading change value indicating a change in heading (e.g., from a previous state), a gear in which the vehicle is or is expected to be operating (e.g., forward, reverse, one of one or more forward gears, one of one or more reverse gears, park, neutral, etc.), and/or associated data. A vehicle computing system may determine vehicle state information for a current (or expected current) vehicle state and/or one or more predicted or expected future vehicle states. A vehicle computing system may use one or more vehicle states to determine one or more controls to implement at the vehicle.

For example, a vehicle computing system (e.g., a trajectory determination system component of the vehicle computing system) may determine a current vehicle state and a path on which the vehicle is traveling through an environment. The vehicle computing system may then determine one or more vehicle controls to implement at various spatial and/or temporal points along that path in order to control the vehicle through the environment to a destination. For example, a vehicle computing system may determine front steering controls and rear steering controls (e.g., independent of one another) at various spatial and/or temporal points along the path of travel to control the vehicle through that path. This sequence of controls and/or the intended path of travel for the vehicle may be represented as a trajectory. The vehicle computing system may determine a predicted vehicle state for one or more such vehicle control implementation points and/or for one or more other points along the path represented in the trajectory. The vehicle computing system may update these predicted vehicle states as the vehicle moves through the environment and/or implements the controls included in the trajectory. The vehicle computing system may update the trajectory based on subsequently determined current and/or predicted vehicle states.

Trajectories and controls that may be implemented based on such trajectories may be used to control autonomous vehicles and/or to assist in the control of human driver-controlled vehicles. For example, such trajectories may be used by a vehicle computing system to control fully autonomous vehicles that may, for example, not have a human driver on-board. Alternatively or additionally, such trajectories may be used to assist a human driver in controlling a vehicle. For example, a vehicle computing system may use trajectory to take over control of a vehicle in the event of a human driver becoming incapacitated or otherwise unable to continue controlling the vehicle. In another example, a vehicle computing system may use trajectory to assist a human driver in controlling a vehicle when, for example, the human driver is determined to be controlling the vehicle into an unsafe or hazardous condition (e.g., imminent collision, veering out of a lane, etc.) without fully taking over control of the vehicle.

In various examples, a vehicle computing device may determine steering controls for either or both axles of a four-wheel steering capable vehicle (e.g., a bidirectional vehicle). In various examples, the angle of steering implemented by such controls may be different at the individual axles or it may be the substantially similar or the same. In various examples, a vehicle having four-wheel steering capabilities implementing the techniques described herein may have substantially similar steering capabilities at its individual axles (e.g., may be capable of a substantially similar range of steering angles at both axles), for example, to facilitate bidirectional motion of the vehicle. In other examples, the techniques described herein may be implemented at vehicles having four-wheel steering capabilities with different steering capabilities at the individual axles and at two-wheel steered vehicles.

In various examples, such steering controls may be directly implemented or may be provided to a steering control system that may determine the mechanical implementation of the steering controls. For example, the vehicle computing system may determine an angle or amount of steering adjustment to provide to a steering control component to implement the steering controls needed to perform the steering adjustment. In other examples, the vehicle computing system may determine a heading direction and/or a sideslip direction to a steering control component to implement the steering controls needed to control the vehicle to as state associated with those directions. In other examples, the vehicle computing system may provide a change in a heading vector, a change in direction of vehicle motion, and/or a change in a sideslip vector along an arc length or a segment of a path to a steering control component to implement the steering controls needed to control the vehicle to as state associated with those directions.

In various examples, the vehicle computing system may also, or instead, determine a desired predicted vehicle state and then determine vehicles controls intended to place the vehicle into that vehicle state. For example, a vehicle computing system may determine that a vehicle should be at a stop and oriented towards a particular landmark at a particular spatial location in an environment. The vehicle computing system may then determine a sequence of controls and a path of travel through the environment that will ultimately result in the vehicle being in that desired vehicle state. In another example, a vehicle computing system may determine front steering controls and rear steering controls (e.g., independent of one another) in order to place the vehicle in a vehicle state having a particular sideslip vector.

A sideslip vector and associated vehicle state data may also, or instead, be used by a vehicle computing system to determine whether and how to control a vehicle in response to detecting one or more objects in the environment. For example, a vehicle computing system may determine a trajectory based on detecting an object that may potentially be within an initially determined path of travel. The vehicle computing system may use a current vehicle state, including curvature, a sideslip vector, and/or a heading vector, to determine a predicted vehicle state at a point along the initially determined path of travel. The vehicle computing system may determine a distance between the object and the vehicle (e.g., between the extents, or length and width of the vehicle) as represented in the predicted vehicle state. More specifically, the vehicle computing system may determine the perpendicular distance between the object and the path of the vehicle, where the path is based on the curvature, the sideslip vector, and/or the heading vector. Based on this distance, the vehicle computing system may determine whether to generate and/or modify one or more controls in a vehicle trajectory to control the vehicle to avoid the object.

In various examples, the disclosed techniques may facilitate control of a vehicle in the event of a malfunction. For example, because the disclosed techniques include seamless determinations of vehicle state data regardless of the number of wheels that may be capable of steering a vehicle, vehicle state data may be readily determined for vehicles where steering functions for one or more steering wheels have become disabled or otherwise malfunctioned. For instance, a vehicle with four-wheel steering may that has lost steering control of one axle may still be controlled using vehicle state data as described herein by implementing the disclosed operations using a fixed steering angle for the malfunctioning axle.

In various examples, a vehicle state (e.g., current, expected current, predicted, etc.) may include two-dimensional location coordinates x and y, a yaw value, an acceleration, a heading vector or heading vector data (e.g., heading vector direction and/or velocity), a sideslip vector or sideslip vector data (e.g., sideslip vector direction and/or velocity), and a curvature representing a change in the direction of motion of the vehicle. A heading direction for a vehicle may be determined as a direction towards which the vehicle body is headed (e.g., a direction that is longitudinal to the vehicle body or otherwise substantially perpendicular to a lateral axis of the vehicle) using the location coordinates and the yaw value. The sideslip vector direction may be represented as an angular difference from the heading direction.

In examples, a vehicle computing system may determine a current or predicted vehicle state at various spatial points and/or temporal points along a path of travel. The distances between such points may be arc lengths (may also be referred to "path segment lengths"). To determine these states, the vehicle computing system may determine a curvature (K) value based on an amount of track angle (Φ) change per arc length (s) change. Track angle may be based on yaw (h) and sideslip direction (β) as show below in equation (1). Sideslip direction (β) may be represented as an angular offset from the yaw (h).

$$\Phi = h + \beta \tag{1}$$

As can be seen here, if sideslip direction (β) is zero, the track angle (Φ) will be equal to the yaw (h). Therefore, when the disclosed techniques are implemented in a two-wheel steered vehicle, the sideslip direction (β) may simply be set to zero, allowing the use of these techniques with either two- or four-wheel steered vehicles. The curvature (K) may be determined as shown below in equation (2), using a difference of amount of track angle (dΦ) per difference arc length (ds), which may be equal to the difference in yaw (dh) per difference in per difference arc length (ds) combined with the difference in sideslip direction (dβ) per difference in per difference arc length (ds).

$$K = \frac{d\Phi}{ds} = \frac{dh}{ds} + \frac{d\beta}{ds} \tag{2}$$

In examples, dh/ds may be referred to as "spatial yaw." By using a curvature (K) that includes the use of the sideslip direction (β) as described herein, the disclosed techniques may more accurately determine and predict vehicle positions, and therefore facilitate more accurate determination of trajectories and potential obstacles. For example, the curvature for both two- and/or four-wheel steered vehicles may be readily determined using the same equations. When the vehicle is a two-wheel steered vehicle (or is only implementing two-wheel steering operations), the sideslip direction (β) may indicate no offset from the yaw direction (e.g., may indicate a sideslip direction that is the same as the heading direction) and the curvature determination may be even further simplified.

Based on the vehicle state data that includes sideslip data and the available vehicle steering capabilities (e.g., two-wheel or four-wheel), an optimized path through an environment may be determined for an operational trajectory for use in controlling a vehicle. The use of the sideslip vector and associated determinations further enables the use of four-wheel steering capabilities by accounting for such capabilities when deterring vehicle controls while still facilitating effective determinations and controls for two-wheel steered vehicles.

The systems and techniques described herein may be directed to leveraging sideslip vectors and associated data to enable a vehicle, such as an autonomous vehicle, to more accurately determine current and predicted positions and other vehicle state data, that may in turn be used for improved trajectory determinations, vehicle controls, object detection and collision avoidance operations, and facilitating safer and more efficient navigation through an environment. In particular examples, the systems and techniques described herein can utilize data structures containing data representing sideslip vectors and associated data, lateral velocities, vehicle wheelbase center points, and curvature data based on sideslip vector data. By using the sideslip vector and vehicle state data determination techniques described herein to more accurately determine a vehicle state parameters, the examples described herein may result in increased safety and accuracy of vehicle control, especially in determining vehicle controls dependent upon accurate determinations of vehicle position, thereby allowing an autonomous vehicle to more safely operate in an environment.

For example, the techniques described herein may be faster and/or more robust than conventional techniques, as they may increase the ability of an autonomous vehicle to safely navigate in an environment by using more accurate determinations of a vehicle position and state to determine predicted vehicle positions, detect potential object intersections, and avoid collisions with objects in the environment. The techniques described herein may also facilitate the use of four-wheel steering technology, which in turn may increase the maneuverability of a vehicle. Such increased maneuverability may increase the ability of an autonomous vehicle to safely navigate in an environment by allowing the vehicle to maneuver around obstacles and hazards that a two-wheel steered vehicle may not be able to avoid. This increased maneuverability may also increase the efficiency of an autonomous vehicle by allowing the vehicle to travel along paths that may be difficult or impossible for a two-wheel steered vehicle to traverse (e.g., paths with especially tight corners, narrow pathways, and/or small gaps). The increase in low-speed maneuverability for four-wheel steered vehicles provided by the disclosed techniques may improve vehicle parking capabilities and low-speed traversal of crowded environments. The ability to implement four-wheel steering capabilities more effectively using the disclosed technique may also increase the safety of vehicle operations by allowing the increase of stability as needed using rear wheel or trailing axle steering (e.g., increasing stability by controlling all four wheel to be directed in a similar direction, for example in extreme cornering situations or in hazardous conditions). Additionally, the disclosed techniques allow the full use of four-wheel steered bidirectional vehicles.

The techniques described herein may also enable improved trajectories and more efficient operation of a vehicle by enable full use of four-wheeled steering technologies. That is, techniques described herein provide a technological improvement over existing vehicle state determination techniques and vehicle steering technology. The techniques described herein may also improve the operation of computing systems and increase resource utilization efficiency. For example, computing systems, such as vehicle computing systems, may more efficiently perform vehicle position and state determinations using the techniques described herein because the disclosed examples may reduce the amount of data needed to represent a vehicle state and the calculations required to determine vehicle state data and trajectories by eliminating separate data structures for two-wheel steered vehicle configurations and four-wheel steered configurations, thereby requiring the processing of fewer buffer data points and/or associated data than would be required using conventional techniques. Furthermore, computing systems, such as vehicle computing systems, may more efficiently perform vehicle state data determination operations by performing less complex and fewer calculations using the techniques described herein, thereby reducing the data processing required in many circumstances to determine predict future vehicle states and generate vehicle trajectories.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicle. In another example, the techniques can be utilized in an aviation or nautical context, or in any system involving vehicle or object trajectories and/or collision avoidance operations. Further, although discussed in the context of originating with particular types of sensor data and processing with particular types of components, data and data structures as described herein can include any two-dimensional, three-dimensional, or multi-dimensional data and data associated with any other types of sensors (e.g., cameras, lidar, radar, sonar, time-of-flight, and the like). Additionally, the techniques described herein can be used with real data (e.g., captured using sensor(s)), simulated data (e.g., generated by a simulator, training data, and the like) or any combination of the two.

Figure 4:
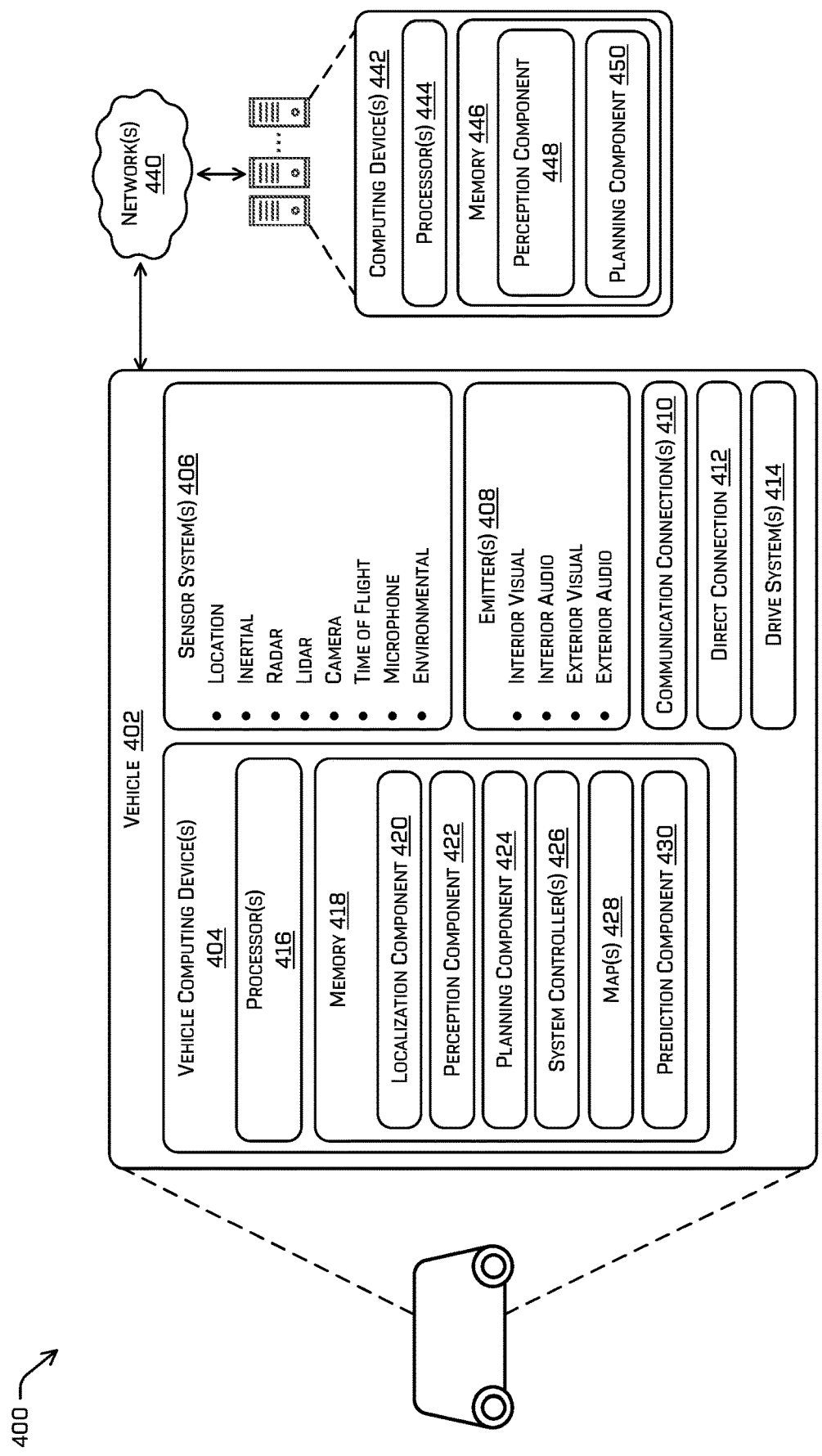
FIG. 4 depicts a block diagram of an example system for implementing the techniques described herein.

FIG. 1 is a pictorial flow diagram of an example process 100 for determining vehicle state data and one or more trajectories based on vehicle state data. In examples, one or more operations of the process 100 may be implemented by a vehicle computing system, such as by using one or more of the components and systems illustrated in FIG. 4 and described below. For example, such one or more components and systems can include those associated with the planning component 424 illustrated in FIG. 4. In examples, the one or more operations of the process 100 may be performed by a remote system in communication with a vehicle, such the planning component 450 illustrated in FIG. 4. In still other examples, the one or more operations of the process 100 may be performed by a combination of a remote system and a vehicle computing systems. However, the process 100 is not limited to being performed by such components and systems, and the components and systems of FIG. 4 are not limited to performing the process 100.

At operation 102, a vehicle computing system, for example executing at and/or controlling an autonomous vehicle, may receive vehicle data associated with a vehicle that may be traversing an environment. For example, the vehicle computing system may receive localization data, vehicle condition data, vehicle operating parameters, previous vehicle state data, maps, a destination, a route, a current operational trajectory, and/or other data from one or more components configured at the vehicle and/or in communication with the vehicle computing system. The vehicle computing system may also, or instead, receive sensor data and/or other environmental data associated with the environment from one or more components configured at the vehicle (e.g., from a perception component) and/or in communication with the vehicle computing system. Alternatively or additionally, the vehicle computing system may receive data based on sensor data at operation 102, such as object detection data.

At operation 104, the vehicle computing system may determine, based on received vehicle data, a current vehicle state for the vehicle. This determined current vehicle state may include a sideslip vector indicating a direction of motion of the vehicle and a current velocity in that direction.

The determined current vehicle state may further include one or more of a position (x, y, yaw) of the vehicle, a heading and/or heading vector for the vehicle, an acceleration and/or acceleration vector for the vehicle, a curvature, and/or a gear in which the vehicle is operating. In various examples, the vehicle computing system may determine whether the current vehicle state is not an expected state. For example, the current vehicle state may indicate that the vehicle is not in an expected location (e.g., based on a path of an operational trajectory). The vehicle computing system may determine a path in such situations that returns the vehicle to the intended path.

At operation 106, the vehicle computing system may determine, for example based on sensor data and/or other environmental data received at operation 102, environment state data for the environment in which the vehicle is traveling. For example, the vehicle computing system may use received sensor data to detect and classify one or more objects in the environment. The vehicle computing system may also, or instead, detect and/or determine road surfaces, weather conditions, traffic signals, signs, etc. At operation 106, the vehicle computing system may determine environment state data that may be used to make trajectory determinations and/or perform other related operations. In some examples, where environment state data is received at operation 102 (e.g., state data resulting from the processing of sensor data), operation 106 may be omitted.

An example 108 illustrates a vehicle 110 that may be operating in an environment and may be configured with and/or in communication with a vehicle computing system. A vehicle 112 may also be configured within the environment of the example 108, for example, traveling in an opposite direction from the vehicle 110 in the next lane on a roadway. A vehicle 114 may also be configured within the environment of the example 108, for example, parked on the roadway and in the same lane as the vehicle 110.

The vehicle 110 may have a current vehicle state that includes a heading 116 in a direction that is perpendicular to a lateral axis of the vehicle 110. The current vehicle state of the vehicle 110 may also include a sideslip vector 118 that has a direction corresponding to the direction of motion of the vehicle 110 and a velocity in that direction. The current vehicle state of the vehicle 110 may also include coordinates indicating a location of a center point of the vehicle 110 (e.g., a center point of the wheelbase of the vehicle 110), a yaw value indicating the vehicle 110's rotation about that center point, acceleration, etc. As can be seen in this example, the direction of the sideslip vector 118 is different than the heading 116 direction. This may be due to the vehicle 110 have four-wheel steering capability such that it may introduce lateral velocity while maintaining a constant yaw.

At operation 120, the vehicle computing system may determine, for a particular spatial and/or temporal point, a predicted environment state. For example, based on various properties and/or classifications of objects detected in the environment, the vehicle computing device may determine predicted locations, velocities, and/or other properties of such objects for a particular time in the future and/or for a particular spatial point at which the vehicle is predicted to be located in the future. For instance, to determine an optimal path for the vehicle through the environment, the vehicle computing system may determine various predicted positions of objects in the environment and determine a path that reduces the probability of an intersection of the vehicle with such objects.

At operation 122, one or more candidate paths through the environment may be determined, for example based on the predicted environment states determined at operation 120. One or more predicted vehicle states for such candidate paths may also be determined at this operation. For example, the vehicle computing system may determine a predicted vehicle state for a particular spatial or temporal point along a predicted path based on one or more controls that would have been implemented to control the vehicle to that spatial or temporal point. In determining a predicted vehicle state, the vehicle computing system may use, along with any one or more other vehicle state parameters, the sideslip vector of the current vehicle state, the heading vector of the current vehicle state, one or more determined predicted sideslip vectors of one or more predicted vehicle states, and/or one or more determined predicted heading vectors of one or more predicted vehicle states. For example, a predicted at any particular point along the path may be substantially parallel or tangent to the sideslip vector direction at that point.

In various examples, the vehicle computing system may use predicted vehicles states and predicted environment states to determine predicted distances between the vehicle and one or more objects. For example, to determine a path that avoids an intersection with an object, the vehicle computing system may determine the vehicle distance from the object for multiple predicted vehicle states (and/or multiple predicted object locations in one or more predicted environment states) and determine a path associated with a predicted vehicle state that avoids an intersection with the object and/or results in at least a threshold distance between the object and the vehicle. In determining these distances, the vehicle computing system may use the sideslip vector to determine the vehicle location and the heading and/or yaw to determine the vehicle orientation and bounds.

Further at operation 122, one or more costs for individual paths determined at this operation may also be determined. For example, the distance that would be traveled for a path may be determined as a cost and/or the resources that would be consumed (e.g., fuel battery power, etc.) to traverse that path may be determined as a cost. Vehicle movements and/or changes may also, or instead, be included in a path cost. For example, path cost may be associated with vehicle rotations and/or translations that may be involved in controlling the vehicle along the path. Other costs that may be determined include, without limitation, passenger comfort costs (e.g., based on jerk, ride quality, road surface, etc.) and safety costs (e.g., based on proximity to objects, distance to obstacles, operation in construction zones, etc.). Such path cost determinations may also include vehicle states associated with the paths. For example, the predicted vehicle state at a point along a candidate path may be included in a path cost determination. A path cost may be an aggregated cost value based on one or more cost factors associated with these types of costs and/or other suitable path costs.

Alternatively or additionally, the vehicle computing system may determine one or more future vehicle states that may be desired. For example, the vehicle computing system may determine that a vehicle should be at a location with particular coordinates in the environment and have a particular yaw value when located at those coordinates. The vehicle computing system may then determine candidate paths that may facilitate the vehicle's traversal to that location. Alternatively or additionally, the vehicle computing system may use, along with any one or more other vehicle state parameters, a sideslip vector and/or a heading vector of a predicted vehicle state to determine candidate paths that may facilitate the vehicle's transition into a state that includes the predicted sideslip vector and/or heading vector.

An example 124 illustrates the vehicle 110 operating in the environment that may include the vehicles 112 and 114. A predicted vehicle state 126 may be determined by the vehicle computing system that is associated with a candidate path 128. The vehicle computing system of vehicle 110 may use the sideslip vector 118 and/or the heading 116 to determine the predicted vehicle state 126. For example, the vehicle 110 may include four-wheel steering capabilities. The predicted vehicle state 126 may be based on predicted controlling of the vehicle 110 such that the heading 116 direction does not change, but the side slip vector adjusts so that the vehicle 110 is controlled to the position associated with the predicted vehicle state 126 (e.g., the vehicle 110 moves forward and left without the body of the vehicle 110 rotating about the wheelbase center point).

In the example 124, the vehicle computing system of vehicle 110 may also, or instead, determine a predicted distance 130 from the vehicle 112 for the predicted vehicle state 126. This predicted distance 130 may be determined based on the perpendicular distance from the vehicle 112 to the path of the vehicle 110 as represented by the vehicle state 126 (e.g., perpendicular to the sideslip vector associated with the predicted vehicle state 126 and/or perpendicular the extents (length and width) of the vehicle associated with the predicted vehicle state 126). Similarly, the vehicle computing system of vehicle 110 may also, or instead, determine a predicted distance 132 from the vehicle 114 for the predicted vehicle state 126. This predicted distance 132 may be determined based on the perpendicular distance from the vehicle 114 to the path of the vehicle 110 as represented by the vehicle state 126 (e.g., perpendicular to the sideslip vector associated with the predicted vehicle state 126). The vehicle computing system of vehicle 110 may use these distances in determining whether to use the candidate path 128 in an operational trajectory for the vehicle 110.

At operation 134, the vehicle computing system may determine an operational trajectory based on the candidate paths and predicted states determined in one or more other operations of the process 100. For example, the vehicle computing system may determine a path for the operational trajectory that maximizes distances from objects in the environment and/or includes the fewest operations needed to control the vehicle to a destination. In various examples, the vehicle computing system may determine a path based on path costs by, for example, selecting a candidate path having a lowest cost from among multiple candidate paths. In various examples, the vehicle computing system may determine a path based returning the vehicle to a previously determined (e.g., intended) path, for example where a current vehicle location is different that an expected vehicle location based on a current operational trajectory. In determining the operational trajectory, the vehicle computing system may also determine one or more controls that operate the vehicle along the determined path and/or otherwise control the vehicle through the environment (e.g., to stop at a destination, accelerate, decelerate, etc.).

An example 136 illustrates the vehicle 110 with a determined operational trajectory 138 that includes a path through the environment that avoids the vehicles 112 and 114. The path of the trajectory 138 may include controls 140 and 142 that may be used to control the vehicle along the path of the trajectory 138. For example, the control 140 may, when the vehicle 110 reaches the control point associated with the control 140, adjust four-wheel steering components of the vehicle to steer the vehicle onto a longitudinal path relative to the heading of the vehicle 110. This control may allow the four-wheel steering components of the vehicle 110 to adjust the direction and velocity of the vehicle 110 (e.g., as represented by the sideslip vector of the vehicle 110) without changing the heading of the vehicle 110. The control 142 may cause the vehicle to apply braking to slow the vehicle as it passes the vehicle 114.

At operation 144, the vehicle computing system may operate the vehicle based on the determination operational trajectory. The process 100 may return to operation 102 for subsequent trajectory determinations.

Figure 2A:
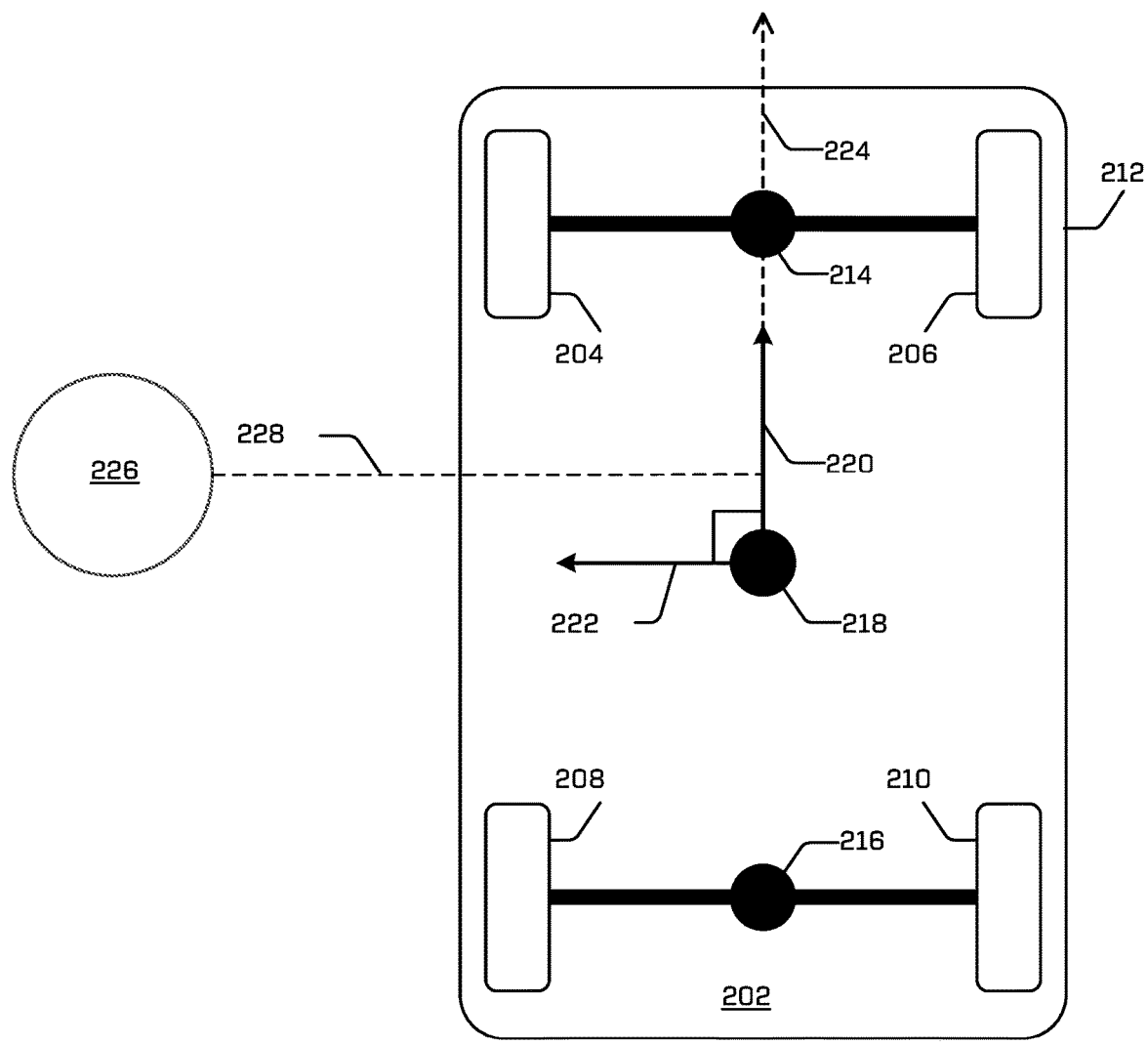
FIGS. 2A-2D depict block diagrams representing an example vehicle, wheel positions, and vectors that may be used for determining a vehicle position and trajectory, in accordance with examples of the disclosure.

FIGS. 2A-D illustrate an environment 200 that may include an example vehicle 202 in various vehicle states and implementing various steering operations. Referring now to FIG. 2A, the vehicle 202 may be configured be with four wheels 204, 206, 208, and 210. The axle 214 may connect wheels 204 and 206 and the axle 216 may connect wheels 208 and 210. The vehicle center point 218 may be a longitudinal center point of the wheelbase of the vehicle 202 (e.g., the center point of the distance between the center points of the axles 214 and 216).

The wheels of the vehicle 202 may directed along a longitudinal axis of the vehicle with no lateral rotation. The vehicle 202 may therefore be traveling in a longitudinal direction of motion. In these vehicle operating conditions, the vehicle 202 may have a vehicle state 212. In this vehicle state 212, the vehicle position may be represented as coordinates and a yaw value (e.g., (x, y, h) as described above). In this example, the yaw is neutral or zero because the vehicle body is not rotated (e.g., about any point). Based on this position data, the vehicle 202 may be determined to have a heading vector 220 with a substantially longitudinal direction. Because there is no lateral velocity in the vehicle state 212, the direction of the vector 220 may also be the direction of the velocity vector for the vehicle 202 (e.g., a sideslip vector with zero lateral velocity). Therefore, the vehicle computing system may determine a path 224 of the vehicle 202 based on the heading vector 220. Because the vehicle is traveling in a longitudinal direction substantially parallel to a longitudinal axis of the vehicle, the vehicle state 212 of the vehicle 202 at this point along the path 224 may be zero or a neutral curvature. The heading normal vector 222 may be a vector normal (perpendicular) to the heading vector 220 and that may be used to perform path and object proximity operations.

An object 226 may also be present in the environment 200. A vehicle computing system may determine object proximity distances based on the perpendicular distance from the object to the vehicle path 224, which may be determined using the heading vector 220 because, in this example, the vehicle velocity vector and the heading vector 220 are interchangeable because the vehicle is undergoing no lateral motion. Thus, the vehicle computing system may determine the distance 228 between the object 226 and the vehicle path 224 determined based on the vector 220. The distance 228 may be determined based on the dimensions or extents (length and width) of the vehicle 202 and/or such vehicle dimensions may otherwise be accounted for in determining the proximity of the object 226 to the vehicle 202.

Figure 2B:
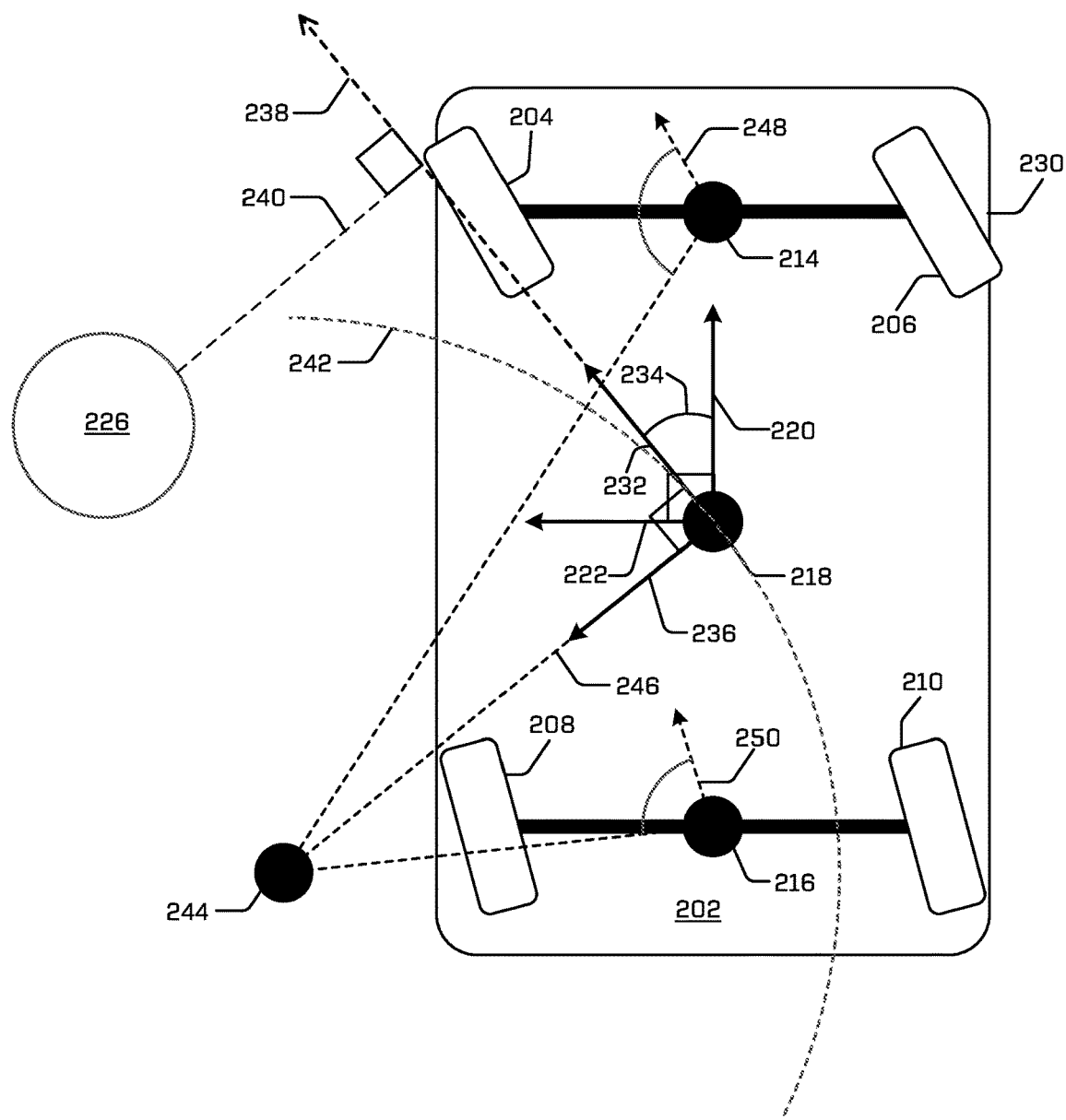

Referring now to FIG. 2B, the vehicle 202 may be configured with the four wheels 204, 206, 208, and 210 rotated in the same direction from a top-down perspective (e.g., counterclockwise), steering the vehicle leftwards while leaving the vehicle yaw unaffected (e.g., neutral or zero). In these vehicle operating conditions, the vehicle 202 may have a vehicle state 230. In this vehicle state 230, the vehicle position may be represented as coordinates and a yaw value (e.g., (x, y, h) as described above), with the yaw value remaining neutral because the vehicle body remains headed in a substantially longitudinal direction. Because the yaw is unaffected despite the steering implemented by the wheels, the vehicle 202 may be determined to have a heading vector 220 with a substantially longitudinal direction. Because there is lateral velocity in the vehicle state 230 due to the four-wheel steering operations being implemented, the velocity vector of the vehicle 202 now has a different direction than the heading vector 220. The velocity vector of the vehicle state 230 may be represented as the sideslip vector 232. In various examples, the sideslip vector 232 may be represented in the vehicle state 230 as an angular difference from the heading vector 220, for example, as angle 234. The vehicle computing system may determine a vehicle path 238 of the vehicle 202 based on the sideslip vector 232 and the heading vector 220. The sideslip normal vector 236 may be a vector normal (perpendicular) to the sideslip vector 232 and that may be used to perform path and object proximity operations.

A curvature 242 may be the curvature of the vehicle 202 (e.g., the curvature of the vehicle 202's direction of motion at the location associated with the state 230) as represented in, or determined based on, the vehicle state 230. For example, the curvature 242 may be determined based on the sideslip vector 232 and the heading vector 220. The curvature 242 may have a center of rotation 244. The sideslip vector 232 may be tangent to the curvature 242, with the curvature radius 246 of the curvature 242 perpendicular to the sideslip vector 232 (e.g., along the same direction as the sideslip normal vector 236). The steering angle 248 may be the steering angle at the center point of the axle 214 relative to the center of rotation 244 (e.g., normal to a line from the center of rotation 244 to the center point of the axle 214). The steering angle 250 may be the steering angle at the center point of the axle 216 relative to the center of rotation 244 (e.g., normal to a line from the center of rotation 244 to the center point of the axle 216). In various examples, and as shown here, the steering angles 248 and 250 may differ (e.g., may be different but in the same direction and/or may be different and in a similar direction). In some examples, that may also, or instead, be controlled to be a substantially similar angle. As will be appreciate from this figure, as the steering angles 248 and 250 increase (e.g., towards longitudinal axis of the vehicle 202 or otherwise become more "straight") the curvature may also increase, and vice versa. Similarly as the radius of curvature is increases or decreased, the steering angles may be increased or decreased, respectively.

Accordingly, in various examples, because the sideslip vector 232 is tangent to the curvature 242, a change in the sideslip vector 232 and/or a change in the curvature 242 may be used to control the steering angles 248 and/or 250 at the vehicle 202, a change in curvature may be used to control steering angles. For example, a control may be determined for a trajectory that indicates a change in curvature that may be interpreted by one or more steering components as a steering angle adjustment. These one or more steering components may implement such a control by physically adjusting the steering angle of the wheels at either or more both axles of the vehicle. Similarly, a control may be determined for a trajectory that indicates a change in the sideslip vector that may be interpreted by one or more steering components as a steering angle adjustment. Here again, the one or more steering components may implement such a control by physically adjusting the steering angle of the wheels at either or more both axles of the vehicle.

The object 226 may remain present in the environment 200. As described herein, the vehicle computing system may determine object proximity distances based on the perpendicular distance from the object to the vehicle path 238, which may be determined using the sideslip vector 232 and the heading vector 220. Here, the vehicle computing system may determine the distance 240 between the object 226 and the vehicle path 238. The distance 240 may be determined based on the dimensions or extents (length and width) of the vehicle 202 and/or such vehicle dimensions may otherwise be accounted for in determining the proximity of the object 226 to the vehicle 202. In this example, the vehicle velocity vector in the form of the sideslip vector 232 and the heading vector 220 have different directions. Therefore, if the path were to be determined using the heading vector 220 (e.g., solely), as can be appreciated from this figure, the distance between the object 226 and the path would be determined to be greater than the distance 240, which may result in a suboptimal trajectory determination. For example, if the vehicle computing system used the heading vector 220 to determine the path and therefore overestimated the distance between the vehicle 202 and the object 226, the vehicle computing system may determine an operational trajectory that may cause the vehicle 202 to potentially intersect with the object 226. For instance, using the heading vector (e.g., solely or primarily) to determine the path and/or curvature may specifically bring the axle associated with axle center point 216 (e.g., rear axle or training axle) into contact with, or unexpectedly proximate to, the object 226. Therefore, by using the disclosed techniques, more accurate and safer trajectories may be determined, especially for vehicle equipped with four-wheel steering capabilities.

Figure 2C:
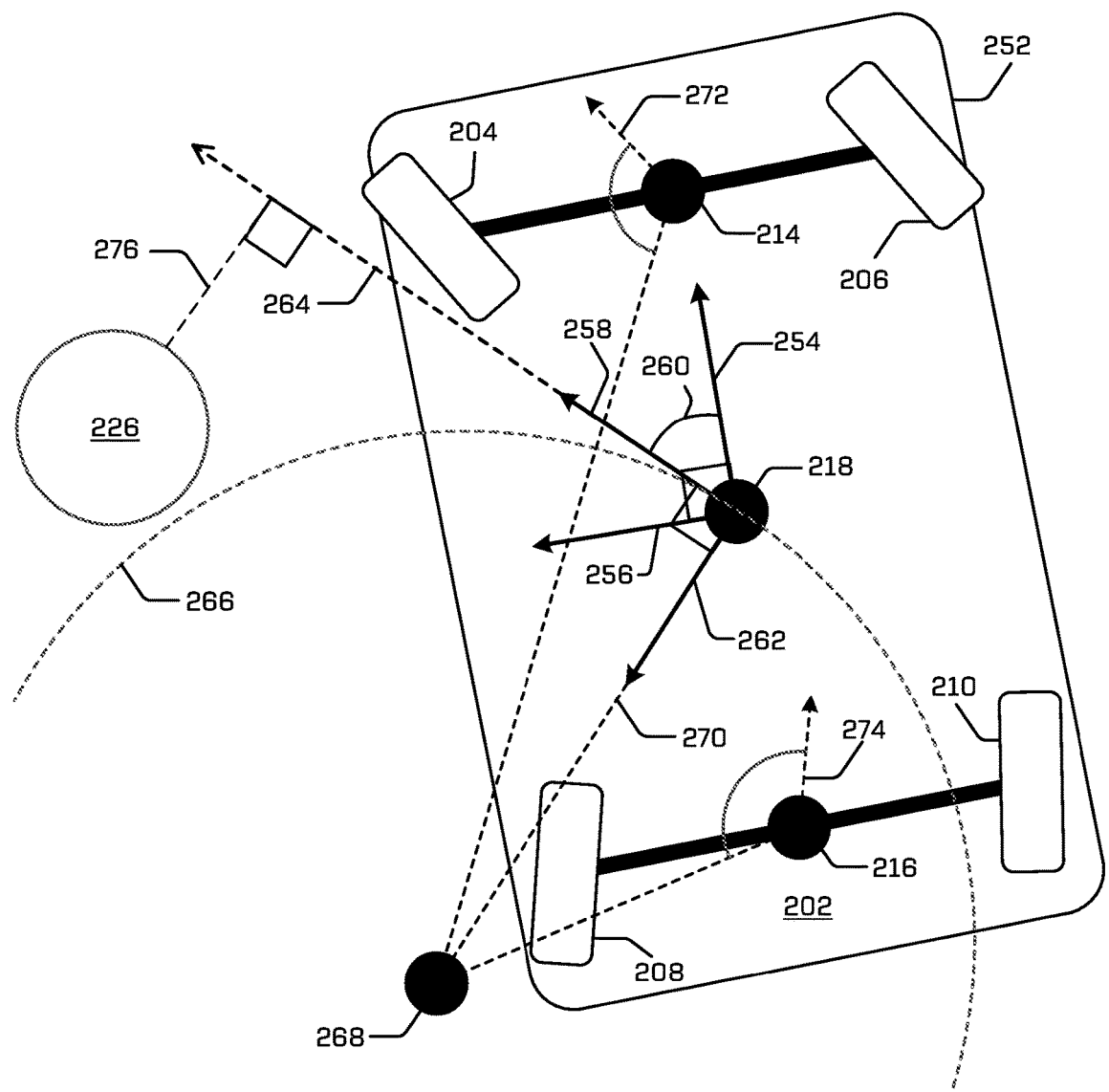

Referring now to FIG. 2C, the vehicle 202 may be configured with the wheels 204 and 206 rotated in one direction from a top-down perspective (e.g., counterclockwise) and the wheels 208 and 210 rotated in an opposite direction (e.g., clockwise), steering the vehicle leftwards about a point in an arc. This type of motion will affect the vehicle yaw (e.g., away from neutral or zero). In these vehicle operating conditions, the vehicle 202 may have a vehicle state 252. In this vehicle state 252, the vehicle position may be represented as coordinates and a yaw value (e.g., (x, y, h) as described above), with the yaw value increasing because the vehicle body is rotated (e.g., compared to the example of FIG. 2A). Because the yaw is affected, in this example, the vehicle 202 may be determined to have a heading vector 254 rotated about the center point 218 relative to the orientation of the heading vector 220 in FIGS. 2A and 2B, with a corresponding heading normal vector 256 similarly rotated. Due to the four-wheel steering operations performed at the vehicle 202, the velocity vector of the vehicle 202 may have a different direction than the heading vector 254. The velocity vector of the vehicle state 252 may be represented as the sideslip vector 258. In various examples, the sideslip vector 258 may be represented in the vehicle state 252 as an angular difference from the heading vector 254, for example, as angle 260. The vehicle computing system may determine a path 264 of the vehicle 202 based on the sideslip vector 258 and the heading vector 254. Here again, a sideslip normal vector 262 may be a vector normal (perpendicular) to the sideslip vector 258 and may be used to perform path and object proximity operations.

A curvature 266 may be the curvature of the vehicle 202 (e.g., the curvature of the vehicle 202's direction of motion at the location associated with the state 252) as represented in, or determined based on, the vehicle state 252. For example, the curvature 266 may be determined based on the sideslip vector 258 and the heading vector 254. The curvature 266 may have a center of rotation 268. The sideslip vector 258 may be tangent to the curvature 266, with the curvature radius 270 of the curvature 266 perpendicular to the sideslip vector 258 (e.g., along the same direction as the sideslip normal vector 262). The steering angle 272 may be the steering angle at the center point of the axle 214 relative to the center of rotation 268 (e.g., normal to a line from the center of rotation 268 to the center point of the axle 214). The steering angle 274 may be the steering angle at the center point of the axle 216 relative to the center of rotation 268 (e.g., normal to a line from the center of rotation 268 to the center point of the axle 216). In various examples, and as shown here, the steering angles 272 and 274 may differ (e.g., may be different but in the same direction and/or may be different and in a similar direction). In some examples, that may also, or instead, be controlled to be a substantially similar angle. As will be appreciate from this figure, as the steering angles 272 and 274 change the curvature may also change. Accordingly, and similar to the example noted above in regard to FIG. 2B, a change in the sideslip vector 258 and/or a change in the curvature 266 may be used to control the steering angles 272 and/or 274 implemented by steering components configured at the vehicle 202.

The object 226 may remain present in the environment 200. As described herein, the vehicle computing system may determine object proximity distances based on the perpendicular distance from the object to the vehicle path 264, which may be determined using the sideslip vector 258 and the heading vector 254. Here, the vehicle computing system may determine the distance 276 between the object 226 and the vehicle path 264. As with the previous examples, the distance 276 may be determined based on the dimensions or extents (length and width) of the vehicle 202 and/or such vehicle dimensions may otherwise be accounted for in determining the proximity of the object 226 to the vehicle 202. In this example, the vehicle velocity vector in the form of the sideslip vector 258 and the heading vector 254 have different directions. Therefore, if the path were to be determined using the heading vector 254, as can be appreciated from this figure, the distance between the object 226 and the path 264 would be determined to be greater than the distance 276, which may result in a suboptimal trajectory determination. For example, if the vehicle computing system used the heading vector 254 (e.g., solely) to determine the path and therefore overestimated the distance between the vehicle 202 and the object 226, the vehicle computing system may determine an operational trajectory that may cause the vehicle 202 to potentially intersect with the object 226. Similar to FIG. 2B, using the heading vector (e.g., solely or primarily) in this example to determine the path and/or curvature may specifically bring the axle associated with axle center point 216 (e.g., rear axle or training axle) into contact with, or unexpectedly proximate to, the object 226. As noted above, the disclosed techniques may be used to determine more accurate and safer trajectories and thereby reduce the likelihood of collisions and other hazardous conditions.

Figure 2D:
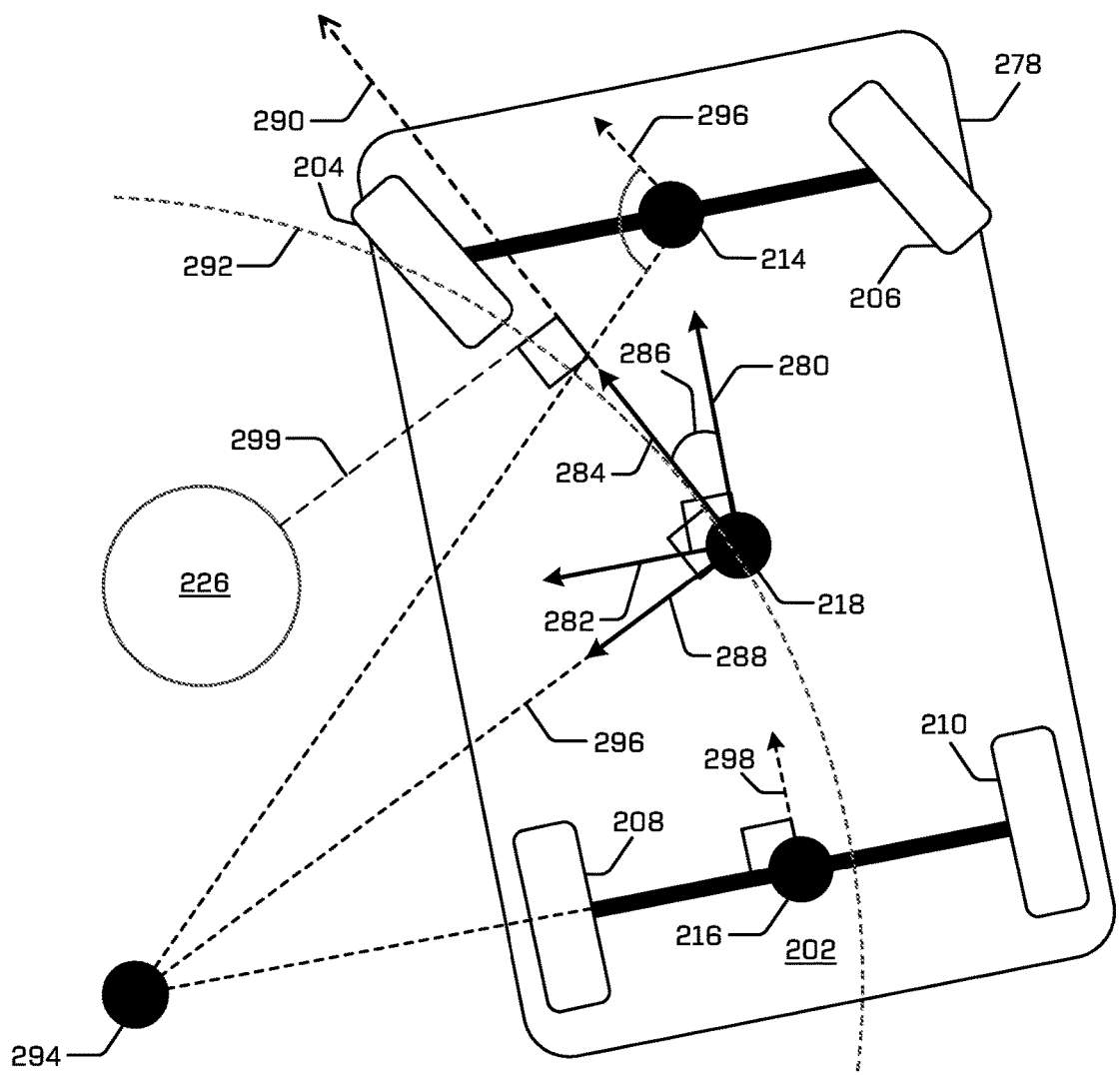

Referring now to FIG. 2D, the vehicle 202 may be configured with the wheels 204 and 206 rotated (e.g., counterclockwise) and the wheels 208 and 210 remaining substantially longitudinally oriented (e.g., as in a two-wheel steered vehicle), steering the vehicle leftwards. This type of motion will affect the vehicle yaw (e.g., away from neutral or zero). In these vehicle operating conditions, the vehicle 202 may have a vehicle state 278. In this vehicle state 278, the vehicle position may be represented as coordinates and a yaw value (e.g., (x, y, h) as described above), with the yaw value increasing because the vehicle body is rotated (e.g., compared to the example of FIG. 2A). Because the yaw is affected, in this example, the vehicle 202 may be determined to have a heading vector 280 rotated counterclockwise about the center point 218 relative to the orientation of the heading vector 220 in FIGS. 2A and 2B, with a corresponding heading normal vector 282 similarly rotated. Due to the two-wheel steering operations performed at the vehicle 202 in this example, the velocity vector of the vehicle 202 may still have a different direction than the heading vector 280. While this difference between these vectors in this example may be less than the difference between the heading vector and the sideslip/velocity vector of the example of FIG. 2B implementing four-wheel steering operations, the difference may remain significant. The velocity vector of the vehicle state 278 may be represented as the sideslip vector 284. In various examples, the sideslip vector 284 may be represented in the vehicle state 278 as an angular difference from the heading vector 280, for example, as angle 286. The vehicle computing system may determine a path 290 of the vehicle 202 based on the sideslip vector 284 and the heading vector 280. Here again, a sideslip normal vector 288 may be a vector normal (perpendicular) to the sideslip vector 284 and may be used to perform path and object proximity operations.

A curvature 292 may be the curvature of the vehicle 202 (e.g., the curvature of the vehicle 202's direction of motion at the location associated with the state 278) as represented in, or determined based on, the vehicle state 278. For example, the curvature 292 may be determined based on the sideslip vector 284 and the heading vector 280. The curvature 292 may have a center of rotation 294. The sideslip vector 284 may be tangent to the curvature 292, with the curvature radius 296 of the curvature 292 perpendicular to the sideslip vector 284 (e.g., along the same direction as the sideslip normal vector 288). The steering angle 297 may be the steering angle at the center point of the axle 214 relative to the center of rotation 294 (e.g., normal to a line from the center of rotation 294 to the center point of the axle 214). The steering angle 298 may be the steering angle at the center point of the axle 216 relative to the center of rotation 294 (e.g., normal to a line from the center of rotation 294 to the center point of the axle 216). In this two-wheel steered vehicle example, as can be seen in this figure, the steering angle at axle 216 is substantially 90 degrees (e.g., because steering is being performed only at axle 214). As with the previous examples, as the steering angles 297 and 298 change the curvature may also change. Accordingly, and similar to the examples noted above in regard to FIGS. 2B and 2C, a change in the sideslip vector 284 and/or a change in the curvature 292 may be used to control the steering angles 297 and/or 298 implemented by steering components configured at the vehicle 202.

The object 226 may remain present in the environment 200. Here again, the vehicle computing system may determine object proximity distances based on the perpendicular distance from the object to the vehicle path 290, which may be determined using the sideslip vector 284 and the heading vector 280. Here, the vehicle computing system may determine the distance 299 between the object 226 and the vehicle path 290. Similar to the previous examples, the distance 299 may be determined based on the dimensions or extents (length and width) of the vehicle 202 and/or such vehicle dimensions may otherwise be accounted for in determining the proximity of the object 226 to the vehicle 202. In this example as in the previous two, the vehicle velocity vector in the form of the sideslip vector 284 and the heading vector 280 have different directions. Therefore, if the path were to be determined using the heading vector 280 (e.g., solely), as can be appreciated from this figure, the distance between the object 226 and the path 290 would be determined to be greater than the distance 299, which may result in a suboptimal trajectory determination. For example, if the vehicle computing system used the heading vector 280 alone to determine the path and therefore overestimated the distance between the vehicle 202 and the object 226, the vehicle computing system may determine an operational trajectory that may cause the vehicle 202 to potentially intersect with the object 226. As with the examples of FIGS. 2B and 2C, using the heading vector (e.g., solely or primarily) in this example to determine the path and/or curvature may specifically bring the axle associated with axle center point 216 (e.g., rear axle or training axle) into contact with, or unexpectedly proximate to, the object 226. As noted above, the disclosed techniques may be used to determine more accurate and safer trajectories and thereby reduce the likelihood of collisions and other hazardous conditions.

Figure 3:
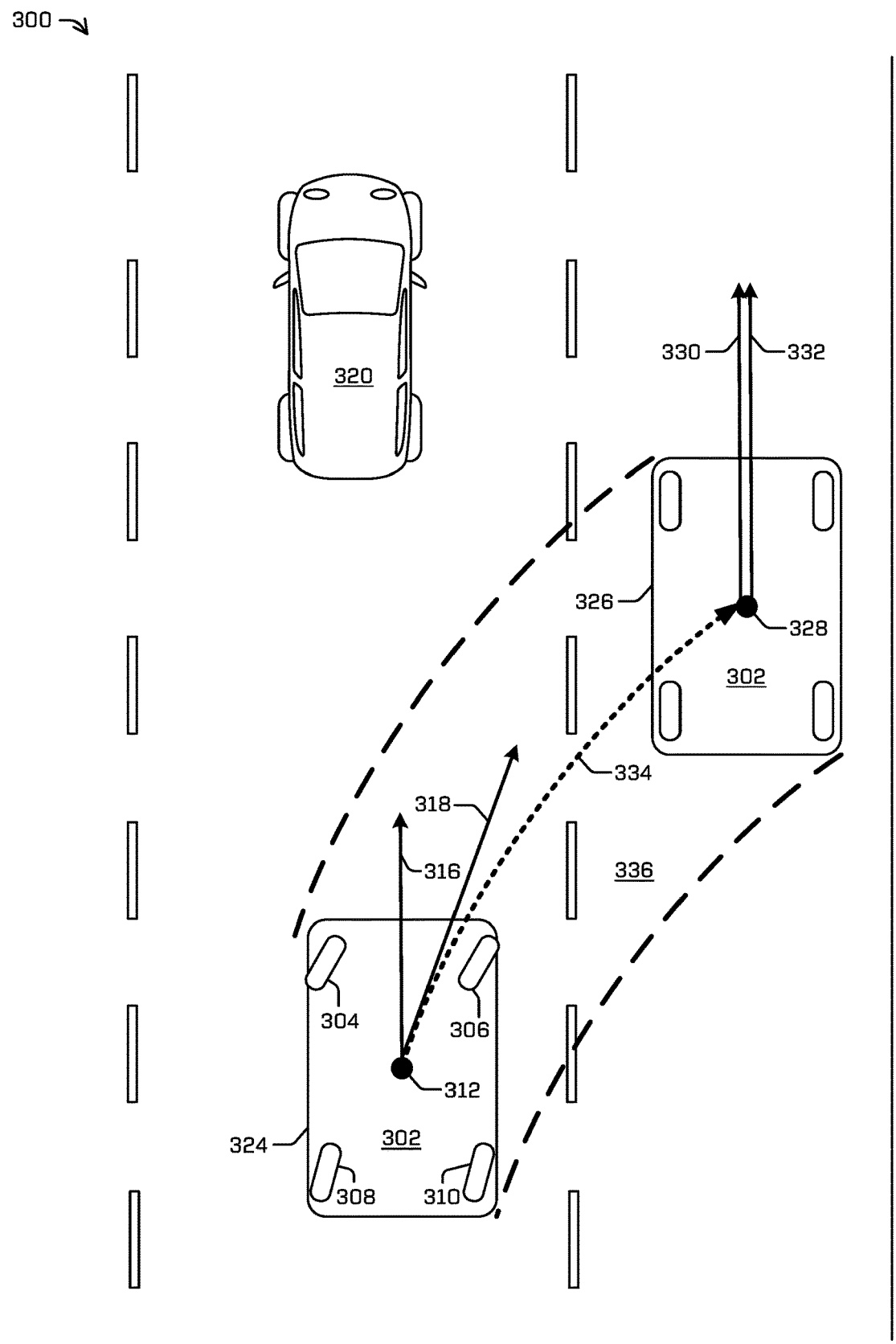
FIG. 3 depicts an example environment and an example vehicle that may implement the vehicle position determination techniques disclosed herein, in accordance with examples of the disclosure.

FIG. 3 illustrates an environment 300 that may include an example vehicle 302 traveling within the environment 300. The vehicle 302 may be configured be with four-wheel steering capabilities. The four wheels 304, 306, 308, and 310 may be individually rotated in the same direction from a top-down perspective causing the vehicle 302 to have a laterally influenced direction of motion and lateral velocity in its current state 324. The vehicle 302 may have a center point 312 that may be a longitudinal center point of the wheelbase of the vehicle 302.

The vehicle state 324 may be used as described herein to determine one or more paths for the vehicle 302 to use in traversing the environment 300. For example, the vehicle state 324 may include vehicle location or position coordinates and a yaw value (e.g., (x, y, h)). In the vehicle state 324, the yaw value may be neutral or zero because the vehicle body is not rotating despite the vehicle 302 undergoing lateral velocity. Because the yaw is unaffected, in this example, the vehicle 302 may be determined to have a heading vector 316 that has a direction that may be substantially parallel to a longitudinal axis of the vehicle 302 (e.g., substantially perpendicular to a lateral axis, a leading axle, or a leading edge of the vehicle 302). Due to the four-wheel steering operations performed at the vehicle 302, the velocity vector of the vehicle 302 may have a different direction than the heading vector 316. The velocity vector of the vehicle state 324 may be represented as the sideslip vector 318 and, in some examples, may be represented in the vehicle state 324 as an angular difference from the heading vector 316.

Using the sideslip vector 318 and the heading vector 216 (and/or one or more predicted sideslip vectors and/or predicted heading vectors for one or more predicted vehicle states), the vehicle computing system may determine a path 334 for the vehicle 302 through the environment 300. The vehicle computing system may also, or instead, determine a corridor 336 for the vehicle 302 through the environment 300 that may represent the area of the environment occupied by the vehicle 302 while it is following a path. The corridor 336 may represent a predicted area that the vehicle 302 may occupy over a period of time and therefore an area for which the vehicle 302 may detect the presence of potential objects or obstacles (e.g., to determine whether there are obstacles or objects that may present a collision risk). In examples, corridor 336 may be a valid drivable surface in which the vehicle 302 may occupy without impacting an object, falling off of a cliff, driving on a sidewalk, etc. The corridor 336 may be dynamically determined based on a temporal state of the environment 300.

For example, the vehicle computing system may determine a predicted vehicle state 326 that may include a position (e.g., (x, y, h)), heading and velocity vectors, predicted vehicle center point 328, and any other state parameters described herein. At this predicted vehicle state, the vehicle may have a substantially longitudinal direction with no lateral velocity. Therefore, the sideslip and/or velocity vector 330 of this state may have a same or substantially similar direction as the heading vector 332 of this state. The vehicle computing system may determine a path 334 that the vehicle may traverse to move from vehicle state 324 to vehicle state 326. In some examples, the vehicle computing system may determine one or more controls to implement along this path to cause the vehicle to move to the state 326. These controls and the path 334 may be represented in a trajectory that may be used by the vehicle computing system to control the vehicle.

The vehicle computing system may also determine a corridor 336 that represents the area occupied by the vehicle 302 as it travels along the path 334. As can be seen from this figure, the area occupied by the vehicle 302 as it moves laterally without rotating (e.g., remaining at neutral yaw) will differ from the area occupied if the vehicle were steered using traditional two-wheel steering operations. For example, in tradition two-wheel steering operations, the width of a corridor occupied by a vehicle may normally be the width of the vehicle. In this example, the corridor 336 may have a width more similar to the diagonal dimensions of the vehicle 302 because, while the vehicle travels along the path 334, due to four-wheeled steering, the body of the vehicle may not rotate to follow the path (e.g., the heading direction may not change even as the velocity direction changes).

A vehicle 320 may be in the environment 300, for example, traveling on the same road as the vehicle 302. The vehicle computing system of vehicle 302 may determine the path 334 so that the corridor 336 is not occupied at any point by both the vehicle 3.02 and the vehicle 320. These path and corridor determinations may be performed using the sideslip vectors and heading vectors determined for various vehicle states (e.g., current, expected, and/or predicted states). For example, the vehicle computing system may determine, for various predicted vehicle states, a distance of the vehicle 320 from the vehicle 302 based on one or more paths determined using the predicted sideslip vectors and predicted heading vectors of such predicted vehicle states. Once the path 334 has been determined as a path for use in controlling the vehicle 302 through the environment 300 the vehicle computing system may determine an operational trajectory for the vehicle 302 that may include controls of various types that will control the vehicle 302 along the path 334 (e.g., to the location associated with the predicted vehicle state 326). Examples of determining corridors and using corridors in path and trajectory determinations are described in U.S. patent application Ser. No. 16/732,087, filed Dec. 31, 2029, now U.S. Pat. No. 11,142,188, issued Oct. 12, 2021, entitled "Action-based reference Systems for Vehicle Control," the entirety of which is incorporated herein by reference for all purposes.

FIG. 4 depicts a block diagram of an example system 400 for implementing the techniques described herein. In at least one example, the system 400 can include a vehicle 402. The vehicle 402 can include a vehicle computing system or device 404 that may function as and/or perform the functions of a vehicle controller for the vehicle 402. The vehicle 402 can also include one or more sensor systems 406, one or more emitters 408, one or more communication connections 410, at least one direct connection 412, and one or more drive systems 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422, a planning component 424, one or more system controllers 426, one or more maps 428, and a prediction component 430. Though depicted in FIG. 4 as residing in memory 418 for illustrative purposes, it is contemplated that each of the localization component 420, the perception component 422, the planning component 424, the one or more system controllers 426, the one or more maps 428, and the prediction component 430 can additionally, or alternatively, be accessible to the vehicle 402 (e.g., stored remotely).

In at least one example, the localization component 420 can include functionality to receive data from the sensor system(s) 406 to determine a position and/or orientation of the vehicle 402 (e.g., one or more of an x-, y-, z-position, roll, pitch, and yaw (h)). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization, and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for generating map data, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 422 can provide processed sensor data that indicates one or more characteristics associated with a detected entity (e.g., a tracked object) and/or the environment in which the entity is positioned. The perception component 422 may use the multichannel data structures as described herein, such as the multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment, for example, using sideslip vectors, four-wheeled steering-related operations, and other aspects described herein. In examples, the planning component 424 can determine various routes and trajectories and various levels of detail. For example, the planning component 424 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints may include streets, intersections, global positioning system (GPS) coordinates, etc. Further, the planning component 424 can generate an instruction (e.g., control) for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

The memory 418 can further include one or more maps 428 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 428 can include at least one map (e.g., images and/or a mesh). In some examples, the vehicle 402 can be controlled based at least in part on the maps 428. That is, the maps 428 can be used in connection with the localization component 420, the perception component 422, and/or the planning component 424 to determine a location of the vehicle 402, identify objects in an environment, and/or generate routes and/or trajectories to navigate within an environment.

In some examples, the one or more maps 428 can be stored on a remote computing device(s) (such as the computing device(s) 442) accessible via network(s) 440. In some examples, multiple maps 428 can be stored based on, for example, a characteristic (e.g., type of entity, time of day, day of week, season of the year, etc.). Storing multiple maps 428 can have similar memory requirements but increase the speed at which data in a map can be accessed.

In general, the prediction component 430 can generate predicted trajectories of objects in an environment. For example, the prediction component 430 can generate one or more predicted trajectories for vehicles, pedestrians, animals, and the like within a threshold distance from the vehicle 402. In some instances, the prediction component 430 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 418 (and the memory 446, discussed below) can be implemented as a neural network. For instance, the memory 418 may include a deep tracking network that may be configured with a convolutional neural network (CNN). The CNN may include one or more convolution/deconvolution layers.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 406 can include multiple instances of each of these or other types of sensors. For instance, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 440, to the one or more computing device(s) at a particular frequency, after a lapse of a predetermined period of time, in near real-time, etc.

The vehicle 402 can also include one or more emitters 408 for emitting light (visible and/or non-visible) and/or sound. The emitter(s) 408 in an example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In some examples, the vehicle 402 can send sensor data, audio data, collision data, and/or other types of data to one or more computing device(s) 442 via the network(s) 440. In some examples, the vehicle 402 can send raw sensor data to the computing device(s) 442. In other examples, the vehicle 402 can send processed sensor data and/or representations of sensor data (e.g., multichannel data structures representing sensor data) to the computing device(s) 442. In some examples, the vehicle 402 can send sensor data to the computing device(s) 442 at a particular frequency, after a lapse of a predetermined period of time, in near real-time, etc. In some cases, the vehicle 402 can send sensor data (raw or processed) to the computing device(s) 442 as one or more log files.

The computing device(s) 442 can include processor(s) 444 and a memory 446 storing one or more perception components 448, and/or planning components 450. In some instances, the perception component 448 can substantially correspond to the perception component 422 and can include substantially similar functionality. In some instances, the planning component 450 can substantially correspond to the planning component 424 and can include substantially similar functionality.

The processor(s) 416 of the vehicle 402 and the processor(s) 444 of the computing device(s) 442 can be any suitable processor capable of executing instructions to process data and perform operations as described herein. By way of example and not limitation, the processor(s) 416 and 444 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 446 are examples of non-transitory computer-readable media. The memory 418 and 446 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 442 and/or components of the computing device(s) 442 can be associated with the vehicle 402. That is, the vehicle 402 can perform one or more of the functions associated with the computing device(s) 442, and vice versa.

Example Clauses

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: determining a position of a vehicle in an environment, the position comprising two-dimensional coordinates and a yaw value; determining a heading vector associated with the vehicle based at least in part on the position, wherein the heading vector comprises a heading direction; determining a sideslip vector associated with the vehicle based at least in part on a direction of motion of the vehicle and a velocity, wherein the sideslip vector comprises a sideslip direction that is different from the heading direction; determining a path segment length; determining a curvature of the vehicle based at least in part on the heading vector, the sideslip vector, and the path segment length; determining a plurality of candidate paths for traversing the environment based at least in part on the curvature; determining an operational vehicle path from among the plurality of candidate paths; determine an operational trajectory for controlling the vehicle based at least in part on the operational vehicle path; and controlling the vehicle based at least in part on the operational trajectory.

B: The system of paragraph A, wherein the position, the heading vector, and the sideslip vector are based at least in part on a longitudinal center point of a wheelbase of the vehicle.

C: The system of paragraph A or B, wherein: determining the plurality of candidate paths comprises: determining that an object is represented in the environment; determining a candidate path based at least in part on the curvature; and determining a perpendicular distance between the object and the candidate path; and determining the operational vehicle path from among the plurality of candidate paths comprises: determining the candidate path as the operational vehicle path based at least in part on the perpendicular distance between the object and the candidate path.

D: The system of any of paragraphs A-C, wherein: the vehicle comprises four-wheel steering components; and determining the operational trajectory comprises determining a four-wheel steering control that controls the four-wheel steering components.

E: The system of any of paragraphs A-D, wherein: determining the four-wheel steering control comprises determining steering angle data based at least in part on the sideslip vector; and the four-wheel steering control causes the steering angle data to be provided to the four-wheel steering components.

F: One or more non-transitory computer-readable media storing instructions that, when executed by one or more processors, perform operations comprising: determining a heading vector associated with a vehicle based at least in part on a position of the vehicle in an environment, wherein the heading vector comprises a heading direction; determining a sideslip vector associated with the vehicle based at least in part on a direction of motion of the vehicle and a velocity, wherein the sideslip vector comprises a sideslip direction that is different from the heading direction; determining a curvature associated with the vehicle based at least in part on the heading vector and the sideslip vector; determining a path for traversing the environment based at least in part on the curvature; and providing the path to a vehicle trajectory determination system.

G: The one or more non-transitory computer-readable media of paragraph F, wherein determining the path comprises: determining a cost associated with the path; and determining the path from among a plurality of candidate paths based at least in part on the cost.

H: The one or more non-transitory computer-readable media of paragraph G, wherein the cost associated with the path is based at least in part on one or more of: vehicle rotation associated with the path; vehicle translation associated with the path; vehicle ride quality associated with the path; or vehicle safety associated with the path.

I: The one or more non-transitory computer-readable media of any of paragraphs F-H, wherein determining the path comprises: determining a perpendicular distance between an object in the environment and the path; and determining the path from among a plurality of candidate paths based at least in part on the perpendicular distance.

J: The one or more non-transitory computer-readable media of any of paragraphs F-I, wherein determining the path comprises: determining a predicted heading vector associated with the vehicle based at least in part on a predicted position of the vehicle; determining a predicted sideslip vector associated with the vehicle based at least in part on a predicted direction of motion of the vehicle and a predicted velocity; and determining the curvature further based at least in part on a difference between the predicted sideslip vector and the sideslip vector and a difference between the predicted heading vector and the heading vector.

K: The one or more non-transitory computer-readable media of paragraph J, wherein the predicted direction of motion is substantially similar to a predicted heading direction of the predicted heading vector.

L: The one or more non-transitory computer-readable media of paragraph J, wherein: the velocity comprises lateral velocity; the position comprises a yaw value; the predicted position of the vehicle comprises a predicted yaw value; and the predicted yaw value is substantially similar to the yaw value.

M: The one or more non-transitory computer-readable media of paragraph L, wherein the predicted velocity comprises a predicted lateral velocity; and the predicted lateral velocity is different than the lateral velocity.

N: The one or more non-transitory computer-readable media of any of paragraphs F-M, wherein determining the path comprises: determining a predicted sideslip vector associated with the vehicle based at least in part on a predicted direction of motion of the vehicle and a predicted velocity; determining a corridor for the path based at least in part on the sideslip vector and the predicted sideslip vector; and determining the path based at least in part on the corridor.

O: A method comprising: determining a position of a vehicle in an environment, determining a heading direction for the vehicle based at least in part on the position; determining a sideslip vector for the vehicle based at least in part on a direction of motion of the vehicle and a velocity, wherein the direction of motion of the vehicle is different from the heading direction; determining a curvature associated with the vehicle based at least in part on the heading direction and the sideslip vector; determining a path for traversing the environment based at least in part on the curvature; and controlling the vehicle based at least in part on the path.

P: The method of paragraph O, wherein controlling the vehicle comprises providing a change of vehicle direction of motion to a four-wheel steering component configured at the vehicle.

Q: The method of paragraph O or P, wherein determining the path comprises: detecting an object in the environment; determining a predicted sideslip vector of the vehicle; determining the path further based at least in part on the predicted sideslip vector; determining a perpendicular distance between a location of the object and the path; and determining the path from among a plurality of candidate paths based at least in part on the perpendicular distance.

R: The method of any of paragraphs O-Q, wherein the velocity comprises lateral velocity.

S: The method of any of paragraphs O-R, wherein determining the curvature is further based at least in part on a path arc length.

T: The method of any of paragraphs O-S, wherein position comprises two-dimensional coordinates of a center point of a wheelbase of the vehicle.

While the example clauses described above are described with respect to one particular implementation, it should be understood that, in the context of this document, the content of the example clauses can also be implemented via a method, device, system, computer-readable medium, and/or another implementation.

Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
determining a position of a vehicle in an environment, the position comprising two-dimensional coordinates and a yaw value;
determining a heading vector associated with the vehicle based at least in part on the position, wherein the heading vector comprises a heading direction;
determining a sideslip vector associated with the vehicle based at least in part on a direction of motion of the vehicle and a velocity, wherein the sideslip vector comprises a sideslip direction that is different from the heading direction;
determining a curvature of the vehicle by:
determining a predicted heading vector associated with the vehicle based at least in part on a predicted position of the vehicle;
determining a predicted sideslip vector associated with the vehicle based at least in part on a predicted direction of motion of the vehicle and a predicted velocity; and
determining the curvature based at least in part on a difference between the predicted sideslip vector and the sideslip vector and a difference between the predicted heading vector and the heading vector;
determining a plurality of candidate paths for traversing the environment based at least in part on the curvature;
determining an operational vehicle path from among the plurality of candidate paths;
determining an operational trajectory for controlling the vehicle based at least in part on the operational vehicle path; and
controlling the vehicle based at least in part on the operational trajectory.

2. The system of claim 1, wherein the position, the heading vector, and the sideslip vector are based at least in part on a longitudinal center point of a wheelbase of the vehicle.

3. The system of claim 1, wherein:
determining the plurality of candidate paths comprises:
determining that an object is represented in the environment;
determining a candidate path based at least in part on the curvature; and
determining a perpendicular distance between the object and the candidate path; and
determining the operational vehicle path from among the plurality of candidate paths comprises:
determining the candidate path as the operational vehicle path based at least in part on the perpendicular distance between the object and the candidate path.

4. The system of claim 1, wherein:
the vehicle comprises four-wheel steering components; and
determining the operational trajectory comprises determining a four-wheel steering control that controls the four-wheel steering components.

5. The system of claim 4, wherein:
determining the four-wheel steering control comprises determining steering angle data based at least in part on the sideslip vector; and
the four-wheel steering control causes the steering angle data to be provided to the four-wheel steering components.

6. One or more non-transitory computer-readable media storing instructions that, when executed by one or more processors, perform operations comprising:

determining a heading vector associated with a vehicle based at least in part on a position of the vehicle in an environment, wherein the heading vector comprises a heading direction;

determining a sideslip vector associated with the vehicle based at least in part on a direction of motion of the vehicle and a velocity, wherein the sideslip vector comprises a sideslip direction that is different from the heading direction;

determining a curvature associated with the vehicle by:
  determining a predicted heading vector associated with the vehicle based at least in part on a predicted position of the vehicle;
  determining a predicted sideslip vector associated with the vehicle based at least in part on a predicted direction of motion of the vehicle and a predicted velocity; and
  determining the curvature based at least in part on a difference between the predicted sideslip vector and the sideslip vector and a difference between the predicted heading vector and the heading vector;

determining a path for traversing the environment based at least in part on the curvature; and providing the path to a vehicle trajectory determination system.

7. The one or more non-transitory computer-readable media of claim 6, wherein determining the path comprises:
  determining a cost associated with the path; and
  determining the path from among a plurality of candidate paths based at least in part on the cost.

8. The one or more non-transitory computer-readable media of claim 7, wherein the cost associated with the path is based at least in part on one or more of:
  vehicle rotation associated with the path;
  vehicle translation associated with the path;
  vehicle ride quality associated with the path; or
  vehicle safety associated with the path.

9. The one or more non-transitory computer-readable media of claim 6, wherein determining the path comprises:
  determining a perpendicular distance between an object in the environment and the path; and
  determining the path from among a plurality of candidate paths based at least in part on the perpendicular distance.

10. The one or more non-transitory computer-readable media of claim 6, wherein determining the curvature is further based at least in part on a path segment length.

11. The one or more non-transitory computer-readable media of claim 10, wherein the predicted direction of motion corresponds to a predicted heading direction of the predicted heading vector.

12. The one or more non-transitory computer-readable media of claim 10, wherein:
  the velocity comprises lateral velocity;
  the position comprises a yaw value;
  the predicted position of the vehicle comprises a predicted yaw value; and
  the predicted yaw value corresponds to the yaw value.

13. The one or more non-transitory computer-readable media of claim 12, wherein:
  the predicted velocity comprises a predicted lateral velocity; and
  the predicted lateral velocity is different than the lateral velocity.

14. The one or more non-transitory computer-readable media of claim 6, wherein determining the path comprises:
  determining a predicted sideslip vector associated with the vehicle based at least in part on a predicted direction of motion of the vehicle and a predicted velocity;
  determining a corridor for the path based at least in part on the sideslip vector and the predicted sideslip vector; and
  determining the path based at least in part on the corridor.

15. A method comprising:
  determining a position of a vehicle in an environment,
  determining a heading direction for the vehicle based at least in part on the position;
  determining a sideslip vector for the vehicle based at least in part on a direction of motion of the vehicle and a velocity, wherein the direction of motion of the vehicle is different from the heading direction;
  determining a curvature associated with the vehicle by:
    determining a predicted heading direction for the vehicle based at least in part on a predicted position of the vehicle;
    determining a predicted sideslip vector for the vehicle based at least in part on a predicted direction of motion of the vehicle and a predicted velocity; and
    determining the curvature based at least in part on a difference between the predicted sideslip vector and the sideslip vector and a difference between the predicted heading direction and the heading direction;
  determining a path for traversing the environment based at least in part on the curvature; and
  controlling the vehicle based at least in part on the path.

16. The method of claim 15, wherein controlling the vehicle comprises providing a change of vehicle direction of motion to a four-wheel steering component configured at the vehicle.

17. The method of claim 15, wherein determining the path comprises:
  detecting an object in the environment;
  determining a predicted sideslip vector of the vehicle;
  determining the path further based at least in part on the predicted sideslip vector;
  determining a perpendicular distance between a location of the object and the path; and
  determining the path from among a plurality of candidate paths based at least in part on the perpendicular distance.

18. The method of claim 15, wherein the velocity comprises lateral velocity.

19. The method of claim 15, wherein determining the curvature is further based at least in part on a path arc length.

20. The method of claim 15, wherein position comprises two-dimensional coordinates of a center point of a wheelbase of the vehicle.

* * * * *